United States Patent

Tiller

[15] 3,665,758
[45] May 30, 1972

[54] DEVICE FOR MEASURING BEARING PRELOAD

[72] Inventor: Newton G. Tiller, Athens, Ala.

[73] Assignee: The United States of America as represented by the Administrator of the National Aeronautics and Space Administration

[22] Filed: July 16, 1970

[21] Appl. No.: 55,534

[52] U.S. Cl. .................................................. 73/140, 73/161
[51] Int. Cl. ........................................................... G01l 5/00
[58] Field of Search ..................... 73/140, 161, 141, 95, 89

[56] References Cited

UNITED STATES PATENTS

| 3,100,989 | 8/1963 | Jones | 73/140 |
| 2,693,699 | 11/1954 | Federn | 73/92 |
| 2,760,370 | 8/1956 | Lindhorst | 73/94 |
| 2,467,539 | 4/1949 | Smith | 23/161 |
| 3,287,966 | 11/1966 | Haan | 73/140 |
| 3,285,065 | 11/1966 | Ragen et al. | 73/161 |

FOREIGN PATENTS OR APPLICATIONS

| 417,152 | 1/1967 | Switzerland | 73/95 |
| 49,423 | 11/1937 | France | 73/161 |

OTHER PUBLICATIONS

Journal of Sci. Instr. Vol. 30, 1959 pp. 444–446.

*Primary Examiner*—Charles A. Ruehl
*Attorney*—L. D. Wofford, Jr., W. H. Riggins and John R. Manning

[57] ABSTRACT

A device for measuring the thrust preload applied by spring washers against bearings mounted on the rotatable armature shaft of a high-speed motor. The assembly containing the motor is a ventilation fan assembly rigidly mounted on a frame opposite a load cell. The exposed end of the rotatable shaft is aligned with and coupled to a rod extending to the load cell. The load cell is forced away from the fan assembly enough to slightly displace the rotatable shaft axially and thereby apply additional pressure against the spring washer exerting the bearing preload. The amount of shaft displacement is read from a dial indicator and the load applied to the shaft is read from a recorder connected to the load cell. The bearing preload is computed from the force-displacement quantities.

7 Claims, 3 Drawing Figures

Patented May 30, 1972

INVENTOR
NEWTON G. TILLER

BY *Wayland H. Riggins*

ATTORNEY 3,665,758

INVENTOR
NEWTON G. TILLER

BY Wayland H. Riggins
ATTORNEY

DEVICE FOR MEASURING BEARING PRELOAD

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

This invention relates generally to measuring devices and more particularly to a device for measuring the thrust preload applied by spring washers against bearings mounted on a rotatable shaft.

A critical factor relating to the reliability and durability of high-speed rotating equipment, such as fans, pumps and various engines, is the preload applied to the bearings installed on rotating shafts incorporated in such equipment. One example of such a rotatable shaft is the armature shaft of a high-speed electric motor wherein the shaft is supported near each end by a ball bearing assembly and a spring washer is pressed against one of the bearing assemblies to apply a thrust preload to both of the bearing assemblies. The thrust preload slightly shifts the outer race of the bearings relative to the inner race so that the bearing balls between the races are subjected to a certain amount of pressure and will not shift back and forth during rotation due to excessive looseness between the balls and races.

If the amount of preload applied against the bearings is not in accordance with the preload limits for which the particular rotating equipment was designed the bearings are likely to fail prematurely. Since the bearing preload is so important to the satisfactory operation of devices using a high-speed rotating shaft, a means is needed for accurately measuring the bearing preload in an assembled device in a quick and convenient manner. This has been found to be a particular need in the quality control of high-speed electrically powered ventilation fans that are to be installed in manned spacecraft wherein extra precautions must be taken to avoid failure during flight.

SUMMARY OF THE INVENTION

The invention comprises a frame, one end of which is adapted for rigidly holding an assembled device incorporating a high-speed, bearing-supported shaft, e.g. an electric-powered fan. In such devices a preload is applied to the bearings supporting the rotatable shaft through a spring that presses against at least one of the bearings. A load cell is mounted on the frame so as to be opposite the fan or other device of which the bearing preload is to be measured. An extension rod extends from the load cell and is coupled to the end of the bearing-supported rotatable shaft. An axial force is applied to the bearing-supported shaft through the load cell extension rod and the shaft is slightly displaced in an axial direction. The axial movement of the shaft causes the bearing assembly fixed on the shaft adjacent the preload spring to likewise move and exert a pressure force on the preload spring. A dial indicator is employed to precisely indicate the amount of axial displacement of the shaft and the exact load applied to the shaft is indicated by a recorder connected to the load cell. The bearing preload is computed from these force-displacement quantities.

Accordingly, it is a general object of the present invention to provide an improved means for measuring the bearing preload applied to bearing assemblies supporting a rotatable shaft.

A more specific object of the invention is to provide a device for quickly, easily and accurately measuring the preload applied to bearing assemblies supporting high-speed armature shafts incorporated in electric motors.

Another object of the invention is to provide a device for applying a precisely measured axial force and displacement to a bearing supported rotatable shaft incorporated in an assembled electric powered fan to permit a determination of the preload applied against the fan bearings.

These and other objects and advantages of the invention will become apparent upon reference to the following specification, attendant claims and the drawing.

DESCRIPTION OF THE PREFERRED EMBODIMENT

Figure 1:
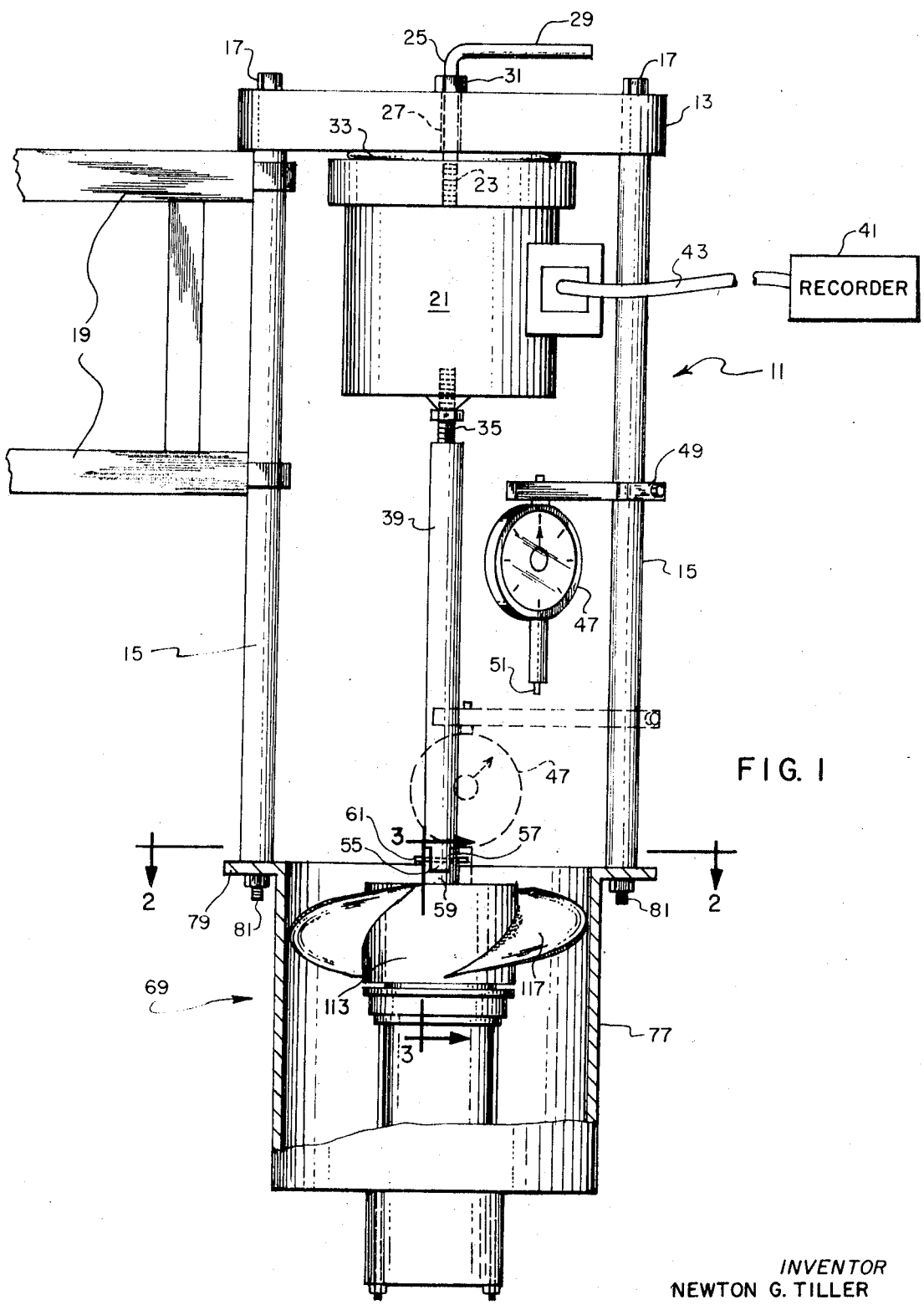
FIG. 1 is a view in elevation and partially in section of a bearing preload measuring device embodying the invention with an electric ventilation fan assembly mounted on the device for bearing preload measurement.

Referring to FIG. 1 the bearing preload measuring device shown therein comprises a frame 11 having an upper rectangular plate 13 from which depends four vertically extending frame members 15. The frame members 15 are connected by bolts 17 to the plate 13 at the respective corners of the plate. The frame 11 may be rigidly supported above a work table or the like (not shown) by bracket members 19 joined to a nearby wall or other relatively heavy structure.

A load cell 21 is supported centrally of the frame 11 by the plate 13. The upper side of the load cell 21 has a threaded opening 23 therein that receives the threaded end of a bolt 25 that extends through an opening 27 in the center of the plate 13. The bolt 25 has an integral handle portion 29 by which the bolt may be rotated to slightly raise or lower the load cell 21 during the bearing preload measuring operation to be subsequently described. A nut 31 on the bolt 25 bears on the upper surface of the plate 13. An elastomer ring 33 is positioned between the load cell 21 and the plate 13. The load cell may be raised and lowered a short distance by rotating the bolt 25 while the elastomer ring 33 remains in contact with the load cell and the plate.

The load cell 21 is a well known commercially available device and will not be described or illustrated in detail. One type of prior art load cell comprises an elastomer core surrounded by a ring. Load applied to the core causes contraction or expansion of the core and the expansion or contraction is sensed by a sensing device such as a strain gauge.

The load cell 21 is provided with a load rod 35 that projects from the lower end of the load cell and is aligned with the vertical axis of the load cell. The load rod 35 acts to transfer a load being measured to the load sensing mechanism within the load cell 21. An extension rod 39 is joined to the load rod 35 and extends downwardly in axial alignment with the load rod 35, load cell 21 and bolt 25. The output of the load cell sensing means is indicated on a recorder 41 connected to the load cell through a cable 43. The procedure for obtaining the proper reading from the recorder 41 in measuring bearing preload will be disclosed hereafter.

A dial indicator 47 is mounted for limited rotational and vertical movement by an adjustable clamp 49 attached to one of the frame members 15. The dial indicator incorporates a plunger 51 and is used for precisely measuring the axial displacement of the bearing-supported shaft as will be subsequently explained.

The lower end of the extension rod 39 comprises an integral lug 55 (FIG. 1) that fits in a slot 57 of a coupling element 59. The lug 55 and coupling element 59 have transversely aligned holes therein that receive a coupling dowel 61 to join the extension rod 39 to the coupling element 59. An integral threaded extension 65 is provided on the coupling element 59 (FIG. 3) which is aligned with the extension rod 39 and also with a shaft 67 of a fan assembly indicated generally at 69. The shaft 67 is a rotatable armature of the fan assembly 69 and has a threaded upper end. The threaded extension 65 of the coupling element and the threaded upper end of the armature shaft correspond in diameter and threading. These corresponding ends abut at 71 (FIG. 3) and are secured by a nut 73 that is threaded tightly against a second nut 75.

The fan assembly 69 includes a cylindrical housing 77 having a circular end flange 79 that contacts the ends of the vertical frame members 15 and bolts 81 firmly join the fan assembly to the frame 11 (FIG. 1).

Figure 3:
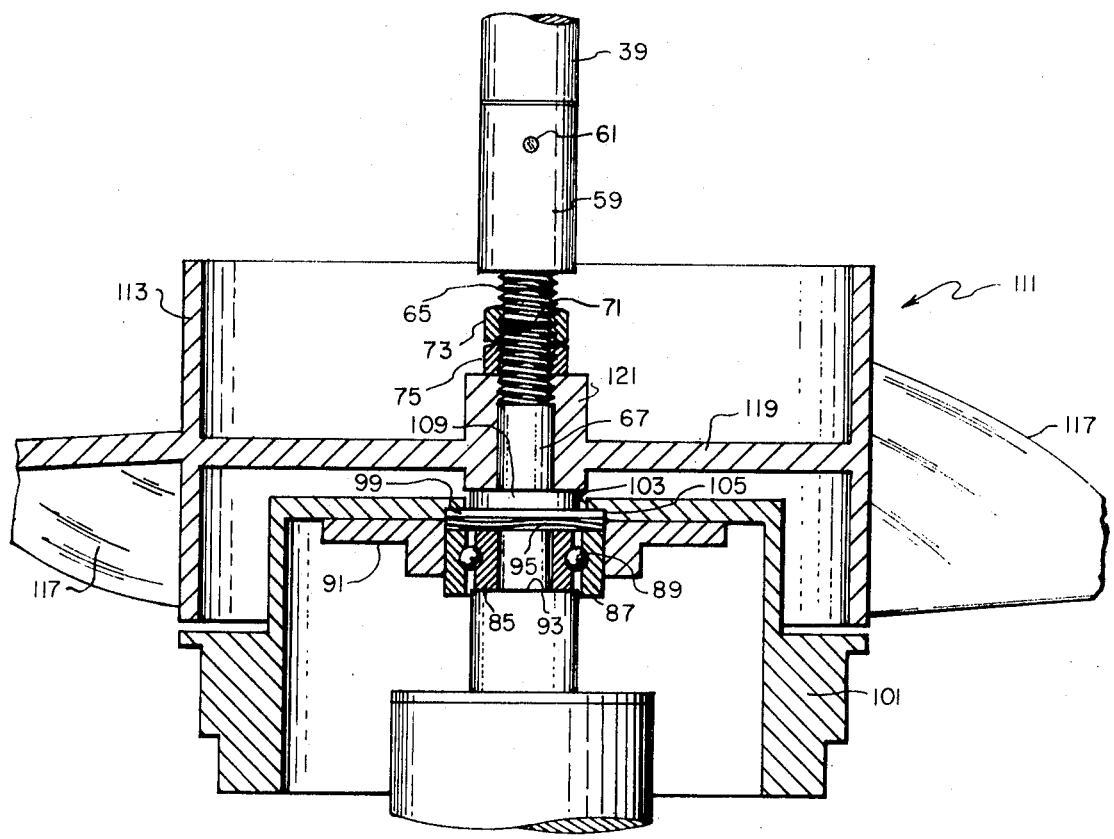
FIG. 3 is an enlarged cross sectional view taken along line 3—3 of FIG. 1 showing the bearing assembly at one end of the electric fan assembly mounted on the bearing preload measuring device.
Figure 2:
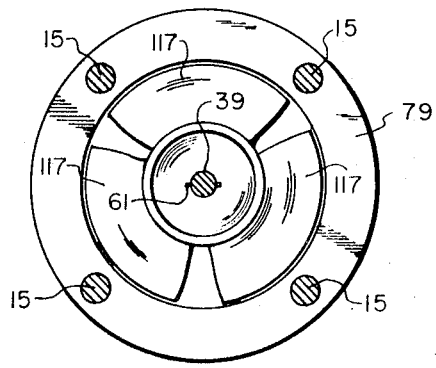
FIG. 2 is a cross sectional view taken along line 2—2 of FIG. 1.

As shown in FIG. 3, the armature shaft 67 of the fan assembly 69 is supported by a bearing assembly having an inner race 85, an outer race 87 and ball bearings 89. The inner race is friction pressed on the shaft 67 and turns with the shaft 67 while the outer race 87 is fitted in a bearing retainer 91. The inner bearing race 85 abuts a shoulder portion 93 of the shaft 67 formed by an increase in the shaft diameter. At the end of the bearing assembly opposite the shoulder 93 a spring washer 95 and a spacer 99 are installed. An end bell housing 101 has a central opening 103 counterbored at 105. The spacer 99 bears on the surface of the counterbore 105 and the spring washer 95 bears on the bearing race 87. The shaft 67 passes through the opening 103 in the bell housing and a spacer 109 is provided on the shaft between the spacer 99 and a fan wheel 111. The fan wheel 111 comprises a cylindrical body 113 integral with blades 117 and a central web 119 that supports a hub portion 121. The fan wheel is fixed to the shaft 67 by the nut 75 and rotates with the shaft.

The bearing assembly as shown in FIG. 3 is subjected to preloading by the spring washer 95 pressing resiliently against the outer race 87 to slightly shift the outer race relative to the inner race 85 and prevent undue slack between the races and the ball bearings 89. The preloading exerted by the spring washer 95 is also applied to a second bearing assembly (not shown) installed on the armature shaft 67 near the lower end thereof. This lower bearing assembly is also preloaded by the spring washer 95 since the washer resiliently urges the shaft 67 downwardly causing a pressing of the lower bearing assembly against the bottom of the bearing retainer in the lower bell housing (not shown). Thus the preload against both the upper and lower bearing assemblies is determined by the preload exerted by the spring washer 95. The amount of preload is critical to the life of the bearing assemblies as discussed previously.

OPERATION

To measure the preload applied against the bearings in the fan assembly 69, the assembly is fixed to the frame 11 in the manner shown in FIG. 1 with the extension rod 39 joined to the armature shaft 67 of the fan assembly. The dial indicator 47 is lowered and rotated on the frame 11 as indicated in phantom line so that the plunger 51 of the dial indicator contacts the upper surface of the web 119 of the fan wheel 111. The dial indicator is then adjusted to read zero.

To assure that no load is applied to the armature shaft at this phase of the operation, the dowel 61 is checked to see if it is free to slide transversely. If the dowel 61 does not slide freely the bolt 25 of the load cell is adjusted to move the extension rod 39 up or down until the dowel 61 slides freely thus assuring that no load is applied against the armature shaft by the load cell. At this stage the dial indicator should be readjusted to zero in case any movement of the armature shaft has occurred.

When it is determined that the armature shaft is under no load from the load cell and the dial indicator is adjusted to zero with the plunger in contact with the web 119, the line indicating zero load is read on the recorder 41. The bolt 25 is then rotated to raise the load cell 21 and the armature shaft 67. As the armature shaft is raised the amount of shaft displacement is read from the dial indicator 47 since the web portion 119 of the fan wheel moves with the shaft 67. When the dial indicator 47 shows that the armature shaft 67 has been displaced between 0.0005 inch and 0.0010 inch rotation of the bolt 25 is stopped. The load applied to the armature shaft through the load cell 21 is then read from the recorder and the bearing preload is computed from the force-displacement quantities. Since the armature shaft 67 has been raised slightly, the bearing assembly moves with the shaft and presses the spring washer 95. The load required to displace the shaft is thus the load required to compress the spring washer 95.

If the bearing preload is below the designed preload an additional spacer, similar to spacer 99, may be installed on the shaft 67 between the spring washer 95 and the bell housing 101. If the preload is excessive a spacer may be removed from the shaft 67. In prior use of the device the spacers 99 were of a minimum thickness of 0.0005 inch and this is why the bearing preload is read after the shaft 67 has been displaced slightly more than 0.0005 inch.

I claim:

1. A device for measuring the thrust preload applied by spring washers to bearing assemblies mounted on a rotatable shaft comprising:
   a. a frame comprising means for rigidly supporting at a predetermined location on said frame an assembled device incorporating a bearing-supported rotatable shaft whereby said shaft is positioned on a predetermined axial line;
   b. a load cell mounted on said frame in spaced relationship to said predetermined location;
   c. said load cell at one end thereof having a load rod extending therefrom adapted to be positioned on said predetermined axial line whereby said load rod may be placed in axial alignment with said rotatable shaft;
   d. means for coupling said load rod to said rotatable shaft while maintaining the axial alignment of said rod and said shaft;
   e. means engaging said load cell at the end thereof opposite said load rod for moving said load cell along said predetermined axial line toward or away from said predetermined location whereby an axial force may be imposed on said shaft through said load rod to effect a small axial displacement of said shaft;
   f. means associated with said load cell for indicating the axial load applied to said shaft through said load cell; and
   g. means for precisely measuring the axial displacement of said shaft.

2. The invention as defined in claim 1 wherein said frame comprises a plate member to which said load cell is connected, said means for moving said load cell along said predetermined axial line comprising a bolt extending through said plate member and being threadedly engaged with said load cell, resilient means positioned between said plate member and said load cell.

3. The invention as defined in claim 2 wherein said bolt comprises a handle portion for rotating said bolt, said threaded engagement between said bolt and said load cell occurring along said predetermined axial line.

4. The invention as defined in claim 2 wherein said resilient means comprises an elastomeric ring contacting said load cell and said plate.

5. The invention as defined in claim 2 wherein said frame comprises a plurality of substantially parallel and coextending frame members, said means for rigidly supporting said assembled device being at one end of said members, said plate member being spaced from said one end and extending transversely of said frame members, said predetermined axial line being substantially equidistant from each of said frame members.

6. The invention as defined in claim 1 wherein said means for coupling said load rod to said rotatable shaft comprises a coupling element having a threaded extension corresponding in diameter to said rotatable shaft, an extension rod extending between said load rod and said coupling element, a connecting dowel extending through said coupling element and said extension rod, said dowel being freely slidable when no axial load is exerted between said coupling element and said extension rod.

7. The invention as defined in claim 1 wherein said means for measuring the axial displacement of said shaft comprises a dial indicator, means for mounting said indicator for vertical and rotational movement on said frame, said indicator comprising a plunger adapted to be placed in contact with a surface of said assembled device.

* * * * *